United States Patent
Shapsa et al.

(10) Patent No.: US 10,147,110 B2
(45) Date of Patent: Dec. 4, 2018

(54) METHODS AND SYSTEMS TO EVALUATE COST DRIVER AND VIRTUAL DATA CENTER COSTS

(71) Applicant: VMware, Inc., Palo Alto, CA (US)

(72) Inventors: Lior Shapsa, Herzliya (IL); Mayan Negbi, Herzliya (IL); Uri Kochavi, Herzliya (IL); Nadav Yakar, Herzliya (IL); Elad Swisa, Herzliya (IL); Yochai Uliel, Herzliya (IL); Guy Ginzburg, Herzliya (IL); Yardena Meymann, Herzliya (IL); Ram Janovski, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 617 days.

(21) Appl. No.: 14/754,083

(22) Filed: Jun. 29, 2015

(65) Prior Publication Data
US 2016/0379237 A1    Dec. 29, 2016

(51) Int. Cl.
*G06Q 10/00*   (2012.01)
*G06Q 30/00*   (2012.01)
*G06Q 30/02*   (2012.01)

(52) U.S. Cl.
CPC .................. *G06Q 30/0206* (2013.01)

(58) Field of Classification Search
CPC ........................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 5,652,842 A | * | 7/1997 | Siegrist, Jr. | G06Q 40/02 345/440 |
| 6,219,654 B1 | * | 4/2001 | Ruffin | G06Q 10/06 705/400 |
| 6,556,974 B1 | * | 4/2003 | D'Alessandro | G06Q 10/0639 705/7.32 |
| 6,877,034 B1 | * | 4/2005 | Machin | G06Q 30/02 702/182 |
| 7,020,621 B1 | * | 3/2006 | Feria | G06Q 10/06375 705/1.1 |

(Continued)

OTHER PUBLICATIONS

Koomey, Jonathan G., et al. "Assessing trends over time in performance, costs, and energy use for servers." Lawrence Berkeley National Laboratory, Stanford University, Microsoft Corporation, and Intel Corporation, Tech. Rep (Year: 2009).*

(Continued)

*Primary Examiner* — Alan S Miller
(74) *Attorney, Agent, or Firm* — Thomas | Horstemeyer, LLP

(57) ABSTRACT

This disclosure is directed to methods and systems to evaluate the performance of a virtual data center ("VDC") running in a data center by comparing costs of cost drivers and VDC costs with cloud computing industry benchmarks. Methods collect costs of cost drivers and total VDC costs of a cloud computing industry. Cost driver industry benchmarks of the cloud computing industry are computed from the costs of the cost drivers and compared costs of cost drivers of a data center to determine which cost drivers of the data center are unacceptable. Methods also include determining a monetary impact of the cost drivers of the data center based the cost driver industry benchmarks and the total VDC costs of the cloud computing industry.

18 Claims, 19 Drawing Sheets

(56) References Cited

U.S. PATENT DOCUMENTS

| | | | | |
|---|---|---|---|---|
| 7,565,331 | B2* | 7/2009 | Cutler | G06Q 10/02 705/348 |
| 7,925,557 | B1* | 4/2011 | Ficery | G06Q 40/00 705/35 |
| 7,987,262 | B2* | 7/2011 | Tung | G06F 9/5072 709/217 |
| 8,195,491 | B2* | 6/2012 | Neuberger | G06Q 10/063 705/1.1 |
| 8,209,415 | B2* | 6/2012 | Wei | H04L 41/0896 709/224 |
| 8,311,863 | B1* | 11/2012 | Kemp | G06Q 10/0639 705/7.11 |
| 8,572,003 | B2* | 10/2013 | Laicher | G06Q 10/10 705/1.1 |
| 9,389,920 | B2* | 7/2016 | Zhang | G06F 9/505 |
| 9,727,847 | B2* | 8/2017 | Kurabayashi | G06Q 20/102 |
| 9,747,136 | B2* | 8/2017 | Sathyamurthy | G06F 9/5077 |
| 9,800,477 | B2* | 10/2017 | Burton | H04L 41/5029 |
| 2002/0019765 | A1* | 2/2002 | Mann | G06Q 10/06 705/7.14 |
| 2002/0091994 | A1* | 7/2002 | McCready | G06Q 10/04 717/124 |
| 2002/0177910 | A1* | 11/2002 | Quarterman | H04L 43/50 700/28 |
| 2003/0050830 | A1* | 3/2003 | Troyer | G06Q 10/06 705/7.38 |
| 2003/0172014 | A1* | 9/2003 | Quackenbush | G06Q 10/06 705/35 |
| 2004/0068431 | A1* | 4/2004 | Smith | G06Q 10/06312 705/7.14 |
| 2004/0073442 | A1* | 4/2004 | Heyns | G06Q 10/06375 705/7.37 |
| 2004/0073467 | A1* | 4/2004 | Heyns | G06Q 10/06375 705/7.37 |
| 2004/0128187 | A1* | 7/2004 | Neuberger | G06Q 10/063 705/7.29 |
| 2004/0243438 | A1* | 12/2004 | Mintz | G06Q 10/04 705/2 |
| 2005/0071285 | A1* | 3/2005 | Laicher | G06Q 10/10 705/400 |
| 2005/0154576 | A1 | 7/2005 | Tarui | |
| 2005/0171918 | A1* | 8/2005 | Eden | G06O 30/02 705/400 |
| 2007/0245004 | A1 | 10/2007 | Chess | |
| 2010/0070784 | A1 | 3/2010 | Gupta | |
| 2010/0125473 | A1* | 5/2010 | Tung | G06F 9/5072 709/200 |
| 2011/0173050 | A1* | 7/2011 | Heyns | G06Q 10/06375 705/7.37 |
| 2011/0295925 | A1* | 12/2011 | Lieblich | G06F 9/5027 709/202 |
| 2012/0102193 | A1* | 4/2012 | Rathore | G06F 9/06 709/224 |
| 2014/0039965 | A1* | 2/2014 | Steven | G06Q 10/06315 705/7.25 |
| 2014/0136688 | A1 | 5/2014 | Kopri | |
| 2014/0282536 | A1* | 9/2014 | Dave | G06Q 30/0631 718/1 |
| 2014/0337442 | A1 | 11/2014 | Zhuang | |
| 2015/0317580 | A1* | 11/2015 | Glissmann-Hochstein | G06Q 10/067 705/7.38 |
| 2016/0147550 | A1 | 5/2016 | McWilliams | |
| 2017/0102693 | A1* | 4/2017 | Kidd | G05B 19/41865 |
| 2017/0243150 | A1* | 8/2017 | Dave | G06Q 10/06393 |

OTHER PUBLICATIONS

Brandl, Reinhard, Martin Bichler, and Michael Ströbel. "Cost accounting for shared IT infrastructures." Wirtschaftsinformatik 49.2 : 83-94. (Year: 2007).*

Office Action dated Apr. 19, 2018 for U.S. Appl. No. 14/754,232.

* cited by examiner

METHODS AND SYSTEMS TO EVALUATE COST DRIVER AND VIRTUAL DATA CENTER COSTS

TECHNICAL FIELD

The present disclosure is directed to methods and systems to evaluate costs of cost drivers and virtual data centers with respect to cloud computing industry benchmarks.

BACKGROUND

In recent years, enterprises have shifted much of their computing needs from enterprise owned and operated computer systems to cloud computing providers. Cloud computing providers charge enterprises to store and run their applications in a cloud-computing facility and allow enterprises to purchase other computing services in much the same way utility customers purchase a service from a public utility. A typical cloud-computing facility is composed of numerous racks of servers, switches, routers, and mass data-storage devices interconnected by local-area networks, wide-area networks, and wireless communications that may be consolidated into a single data center or distributed geographically over a number of data centers. Enterprises typically run their applications in a cloud-computing facility as virtual machines ("VMs") that are consolidated into a virtual data center ("VDC") also called a software defined data center ("SDDC"). A VDC recreates the architecture and functionality of a physical data center for running an enterprise's applications. Because the vast numbers of VDCs and dynamic nature of VDCs running in a typical cloud-computing facility, VDC's introduce management challenges to information technology ("IT") managers. Many IT managers lack the insight needed to objectively identify and prioritize VDC strengths and weaknesses. While numerous internal metrics exists to evaluate the performance of hardware and VM's running in a typical data center, IT managers often find it difficult to evaluate and rank VDC performance based these internal metrics.

SUMMARY

This disclosure is directed to methods and systems to evaluate the performance of a virtual data center ("VDC") running in a data center by comparing costs of cost drivers and VDC costs with cloud computing industry benchmarks. In one aspect, methods collect costs of cost drivers and total VDC costs of a cloud computing industry. Cost driver industry benchmarks of the cloud computing industry are computed based on the costs of the cost drivers and the costs of cost drivers of a data center are compared with the cost driver industry benchmarks to determine which cost drivers of the data center are outside acceptable cost driver bounds. Methods also include determining monetary impact of the cost drivers of the data center based the cost driver industry benchmarks and the total VDC costs of the cloud computing industry.

DETAILED DESCRIPTION

Figure 1:
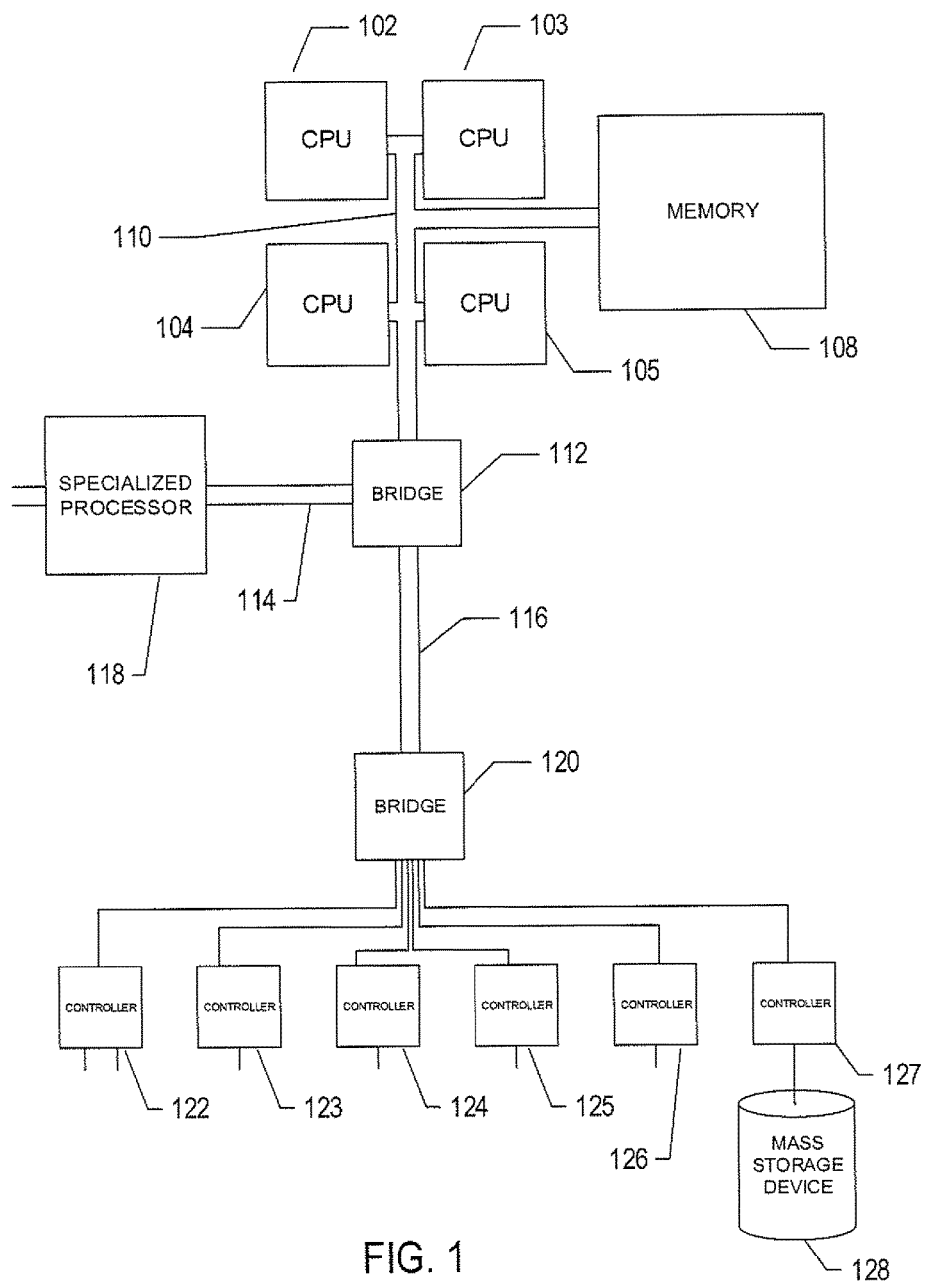
FIG. 1 shows a general architectural diagram for various types of computers.

This disclosure is directed to methods and systems to evaluate the performance of a virtual data center ("VDC") running in a data center by comparing costs of cost drivers and VDC costs with cloud computing industry benchmarks. A general description of physical data centers, hardware, virtualization, virtual machines, and VDC's are provided in a first subsection. Computational methods and system to compute cloud computing industry benchmarks and compare the industry benchmarks with costs of cost drivers and VDC cost of VDCs run in a physical data center are provided in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the topics discussed below are tangible, physical components of physical, electro-optical-mechanical computer systems.

FIG. 1 shows an architectural diagram for various types of computers. Computers that receive, process, and store event messages may be described by the architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
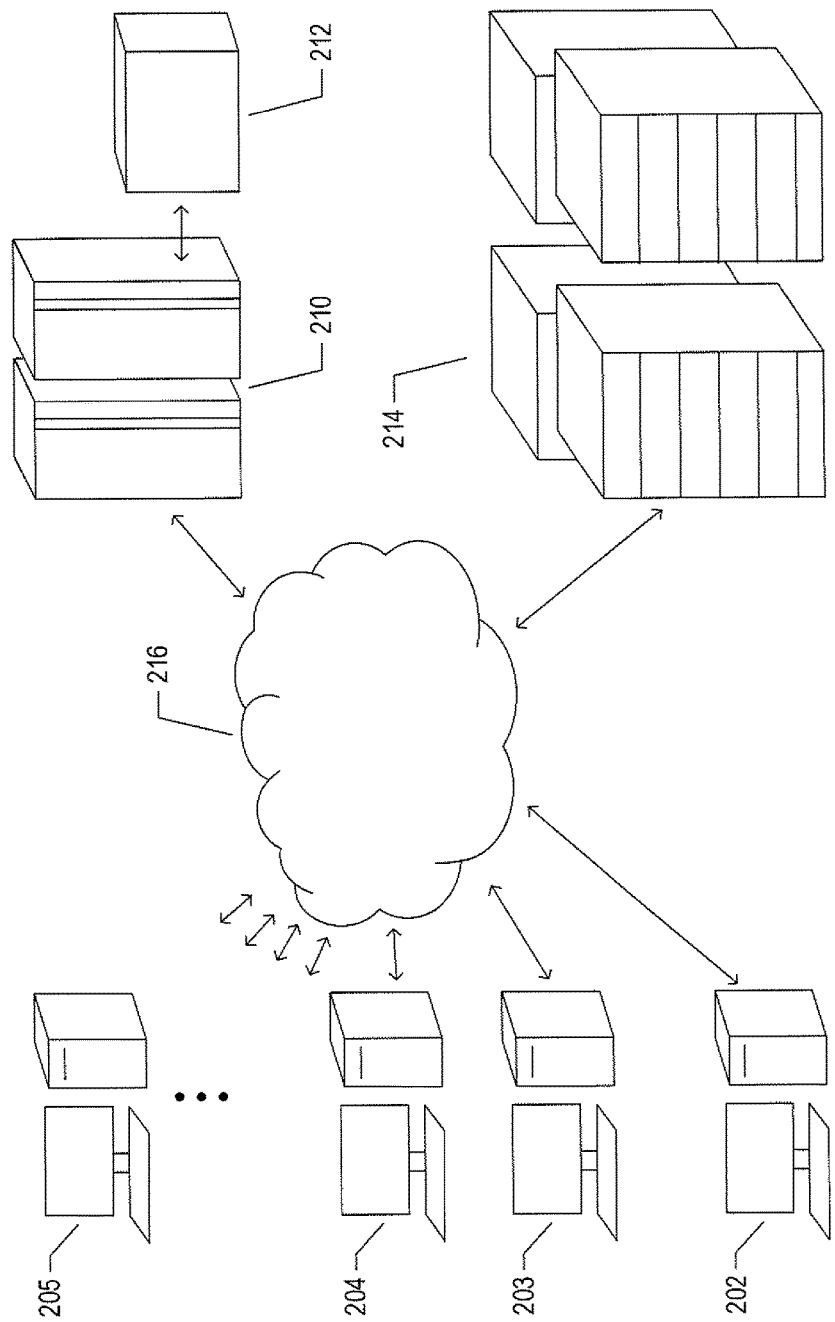
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
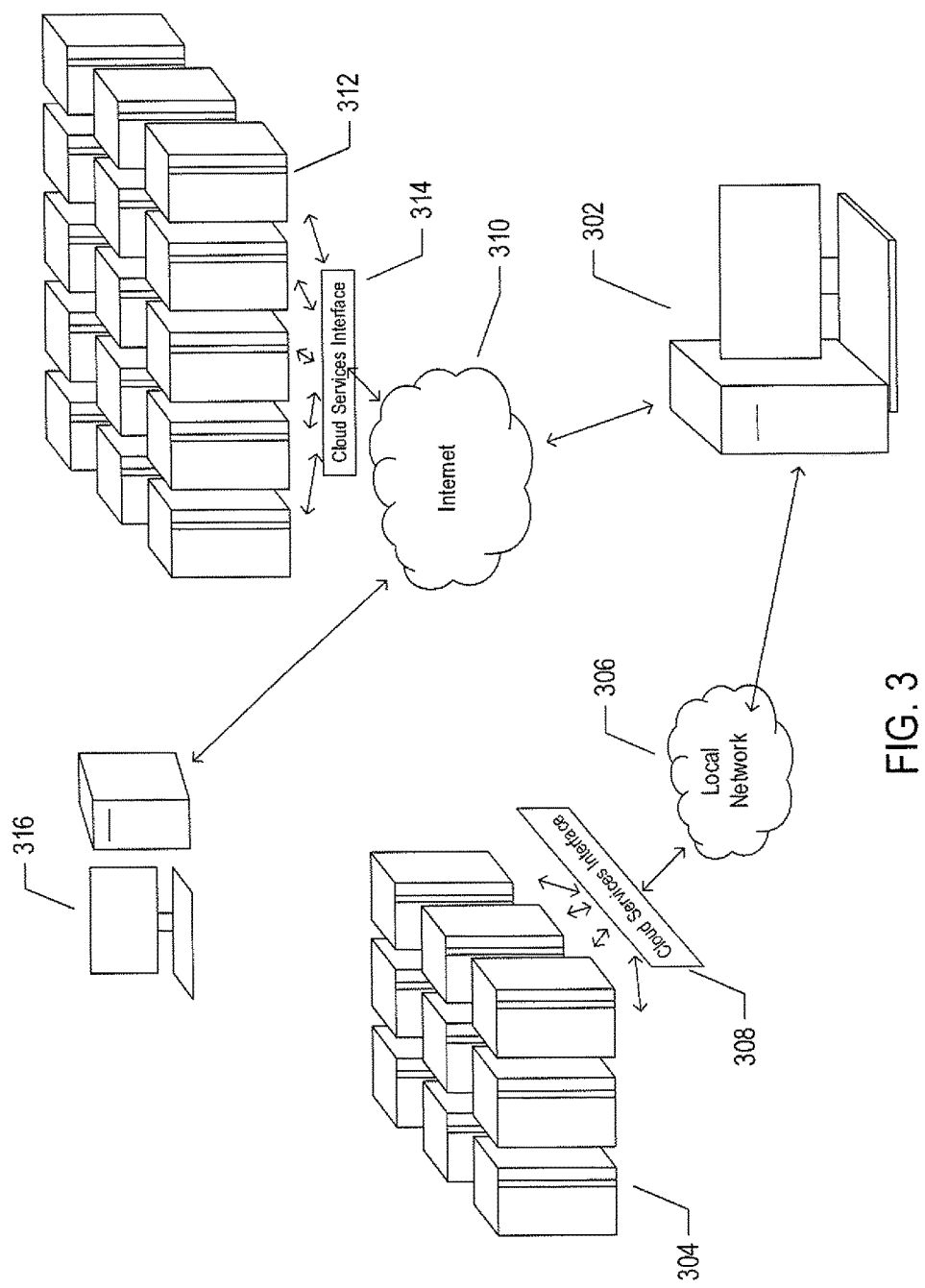
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
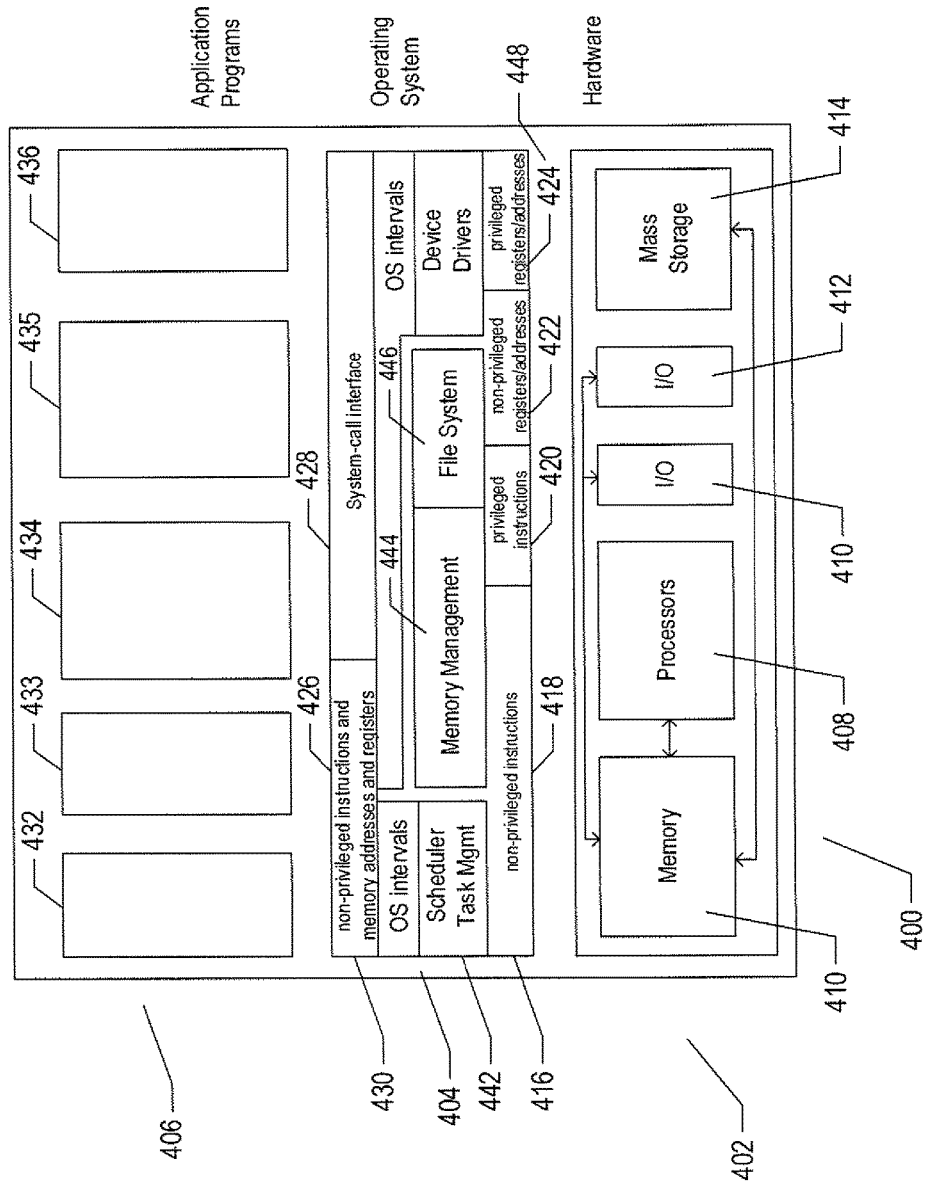
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
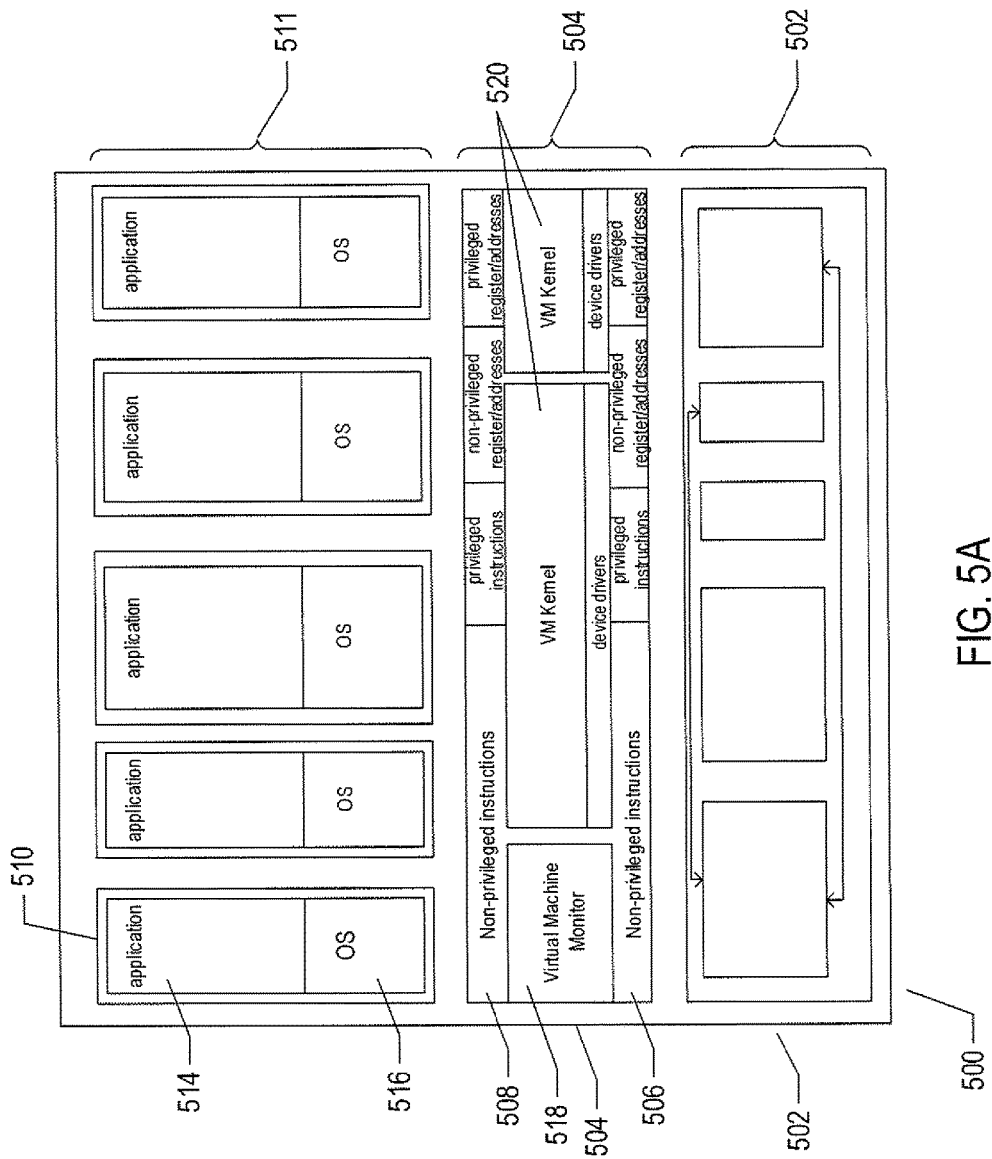
FIGS. 5A-5B show two types of virtual machine and virtual-machine execution environments.
Figure 5B:
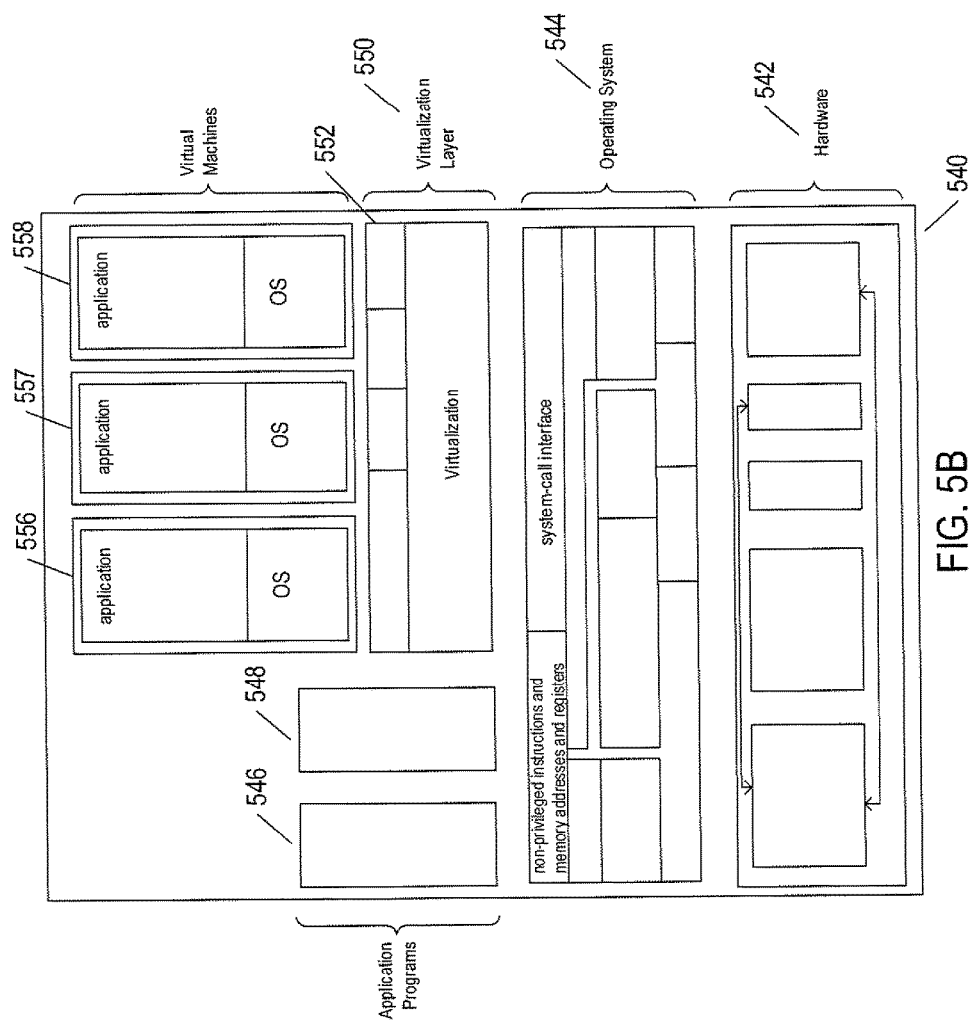

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
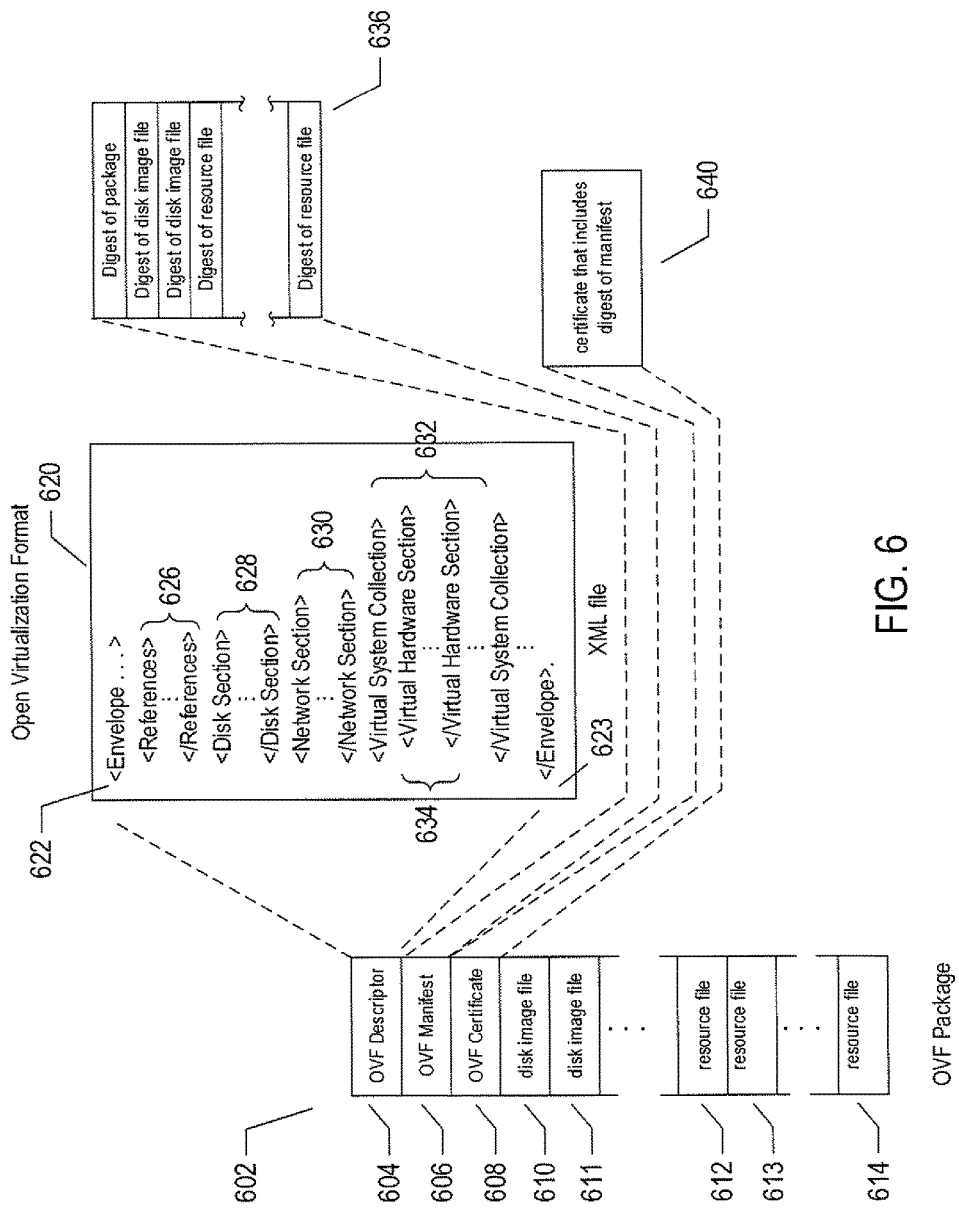
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
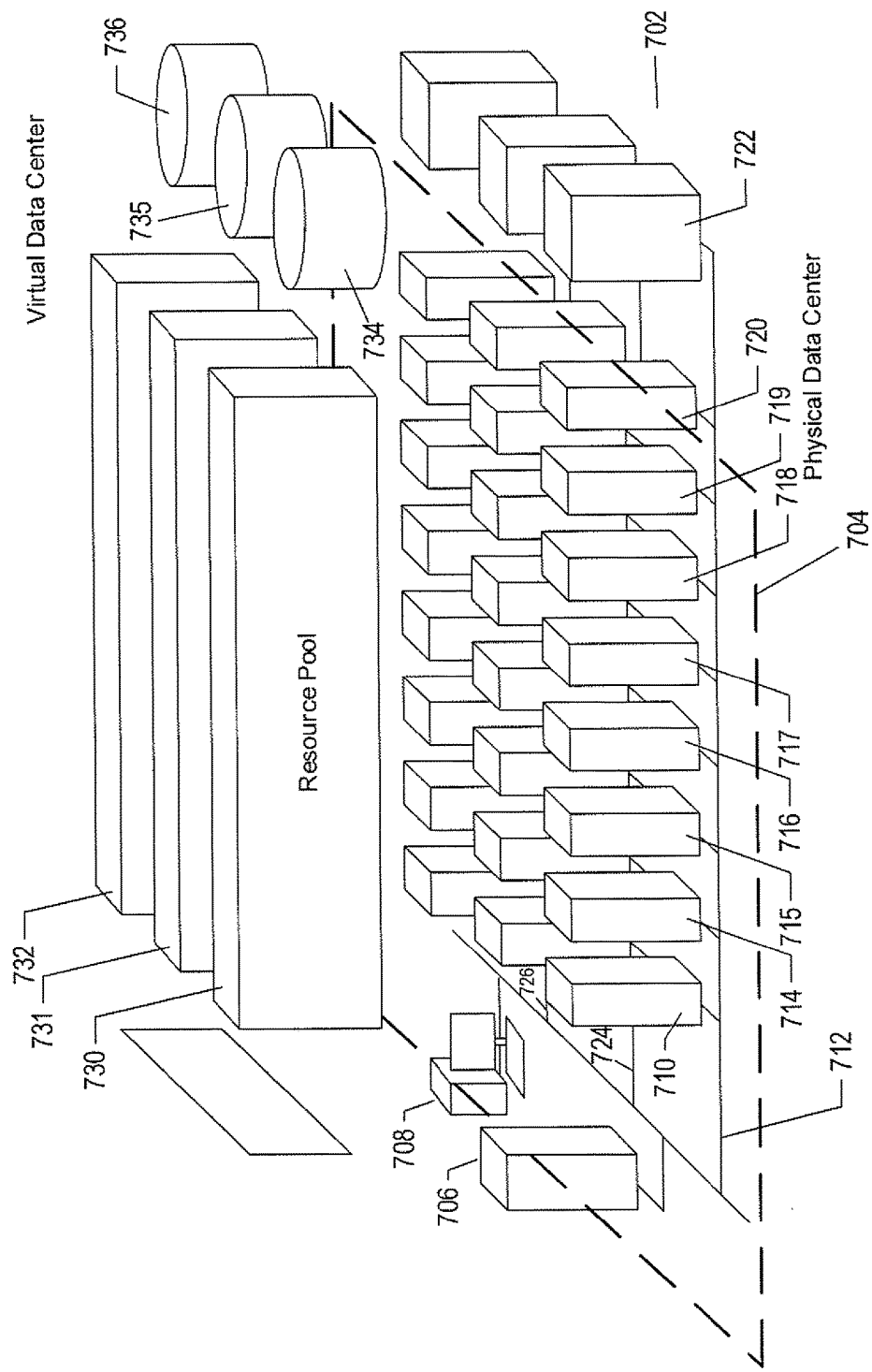
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
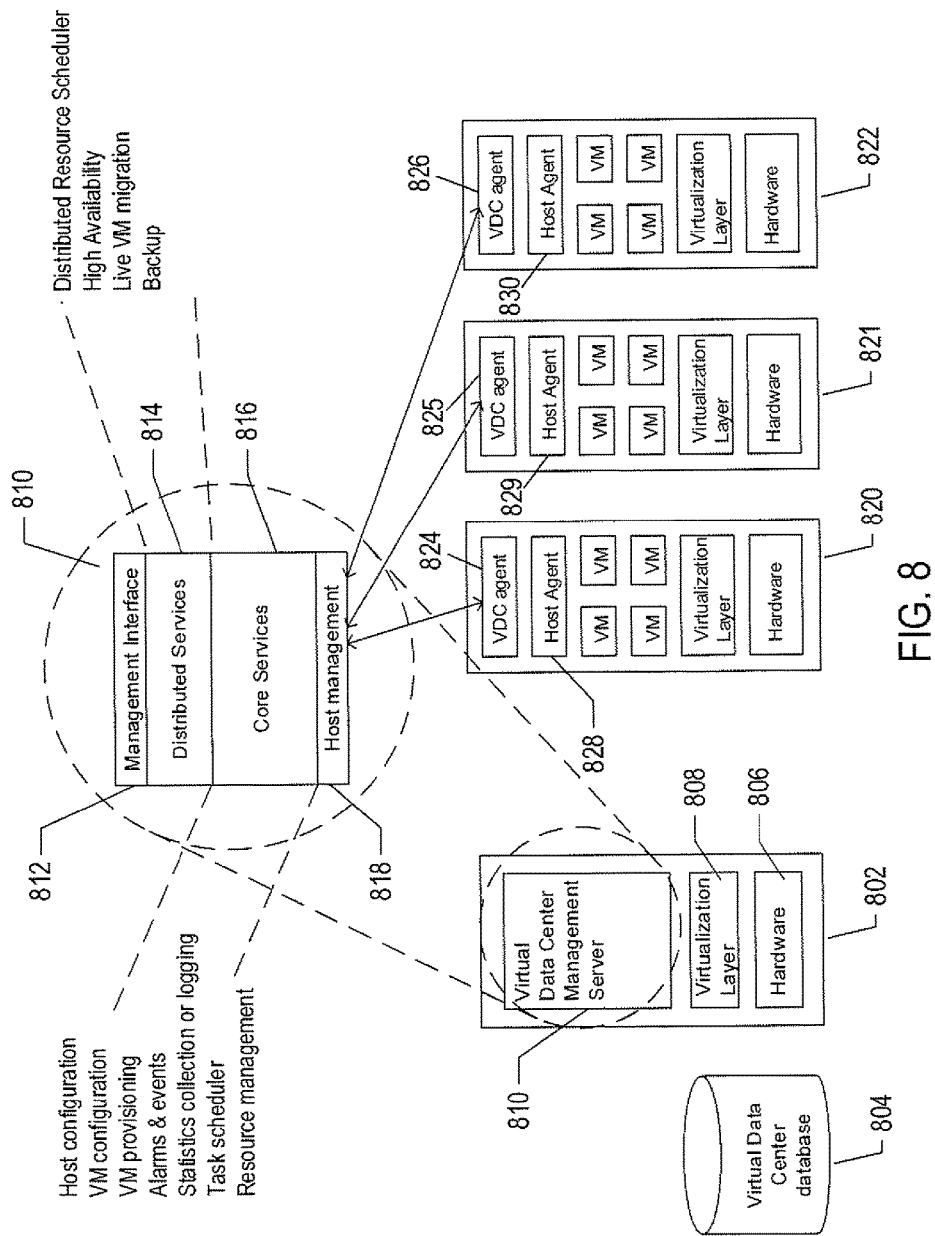
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
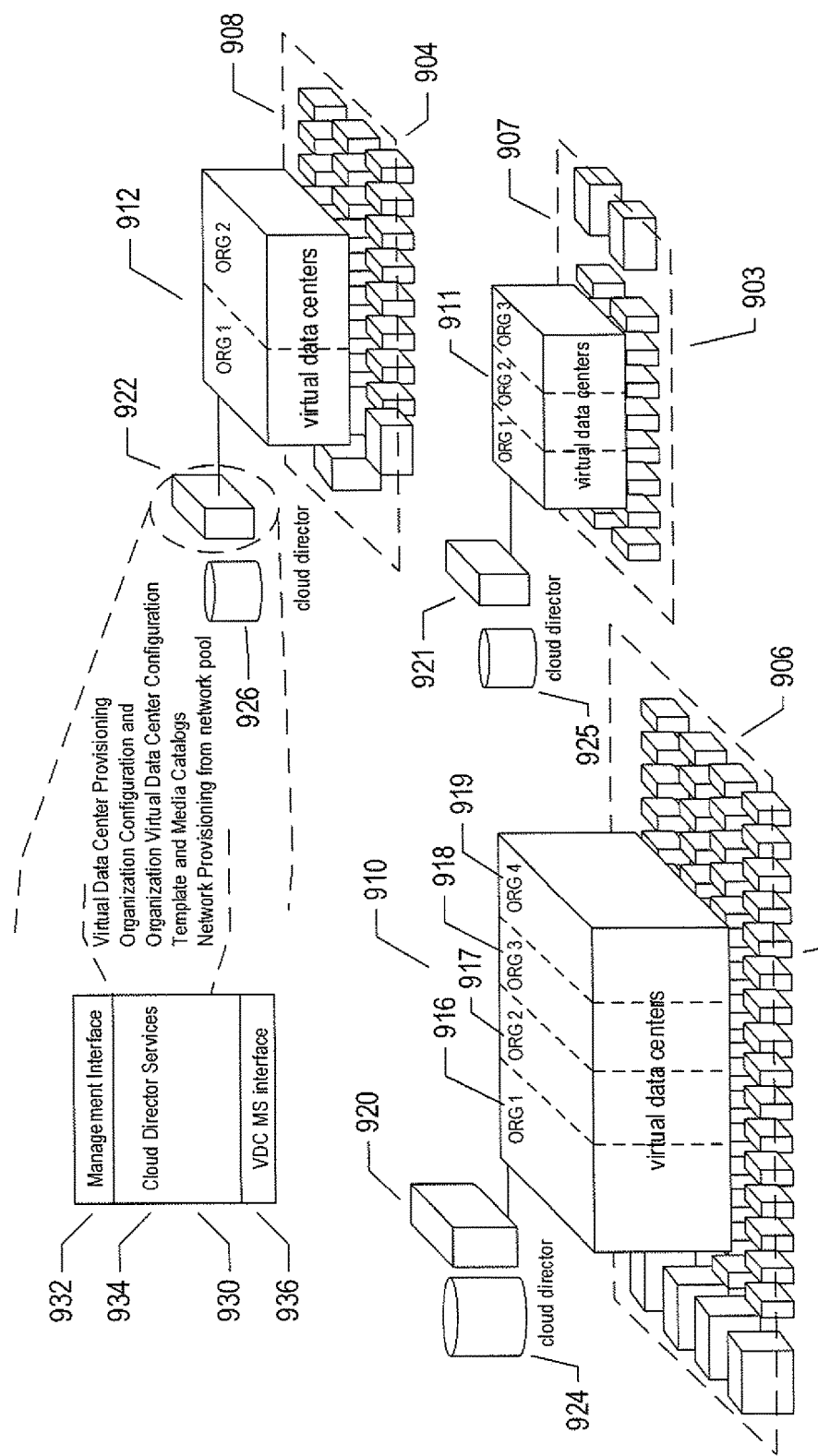
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
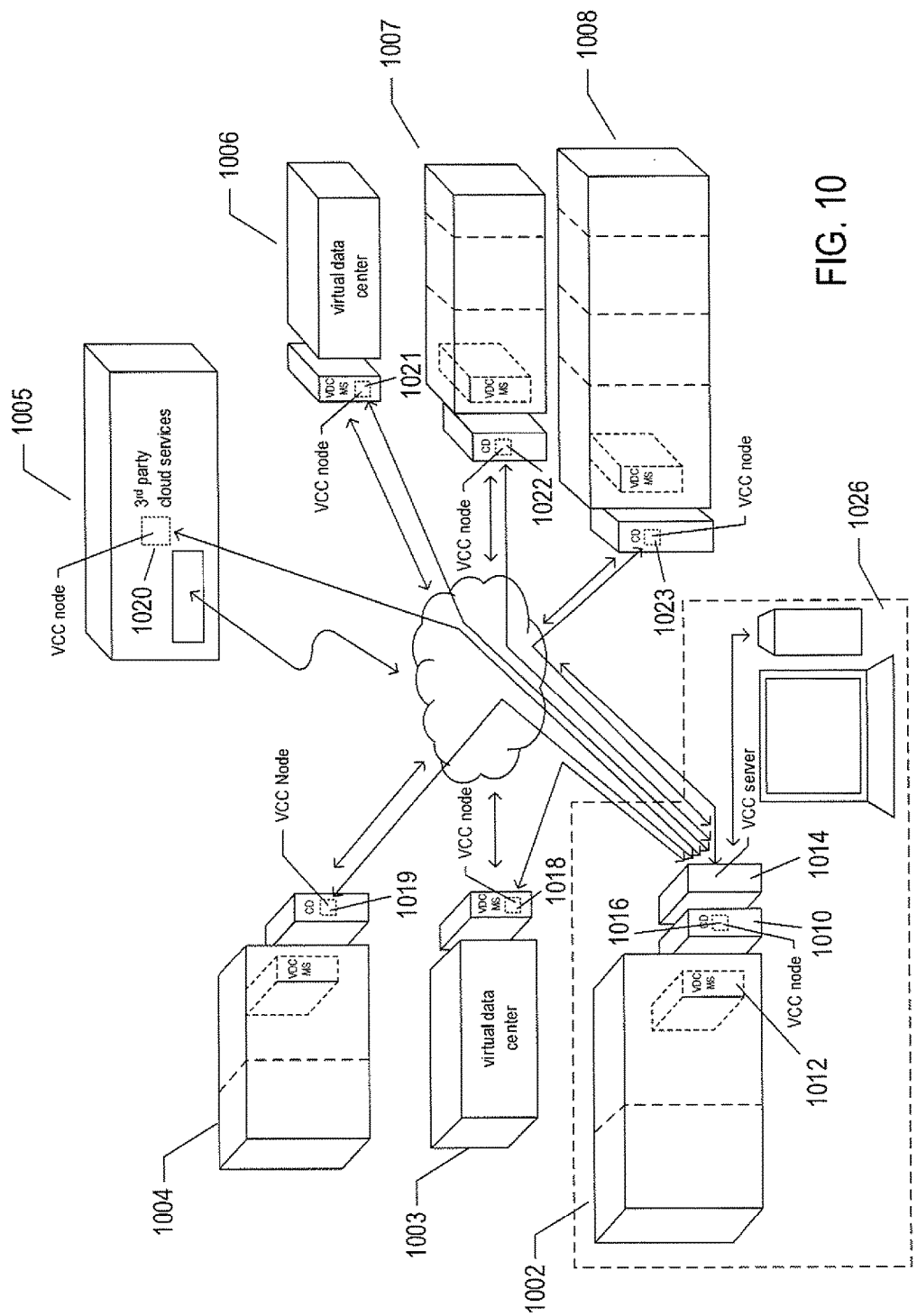
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
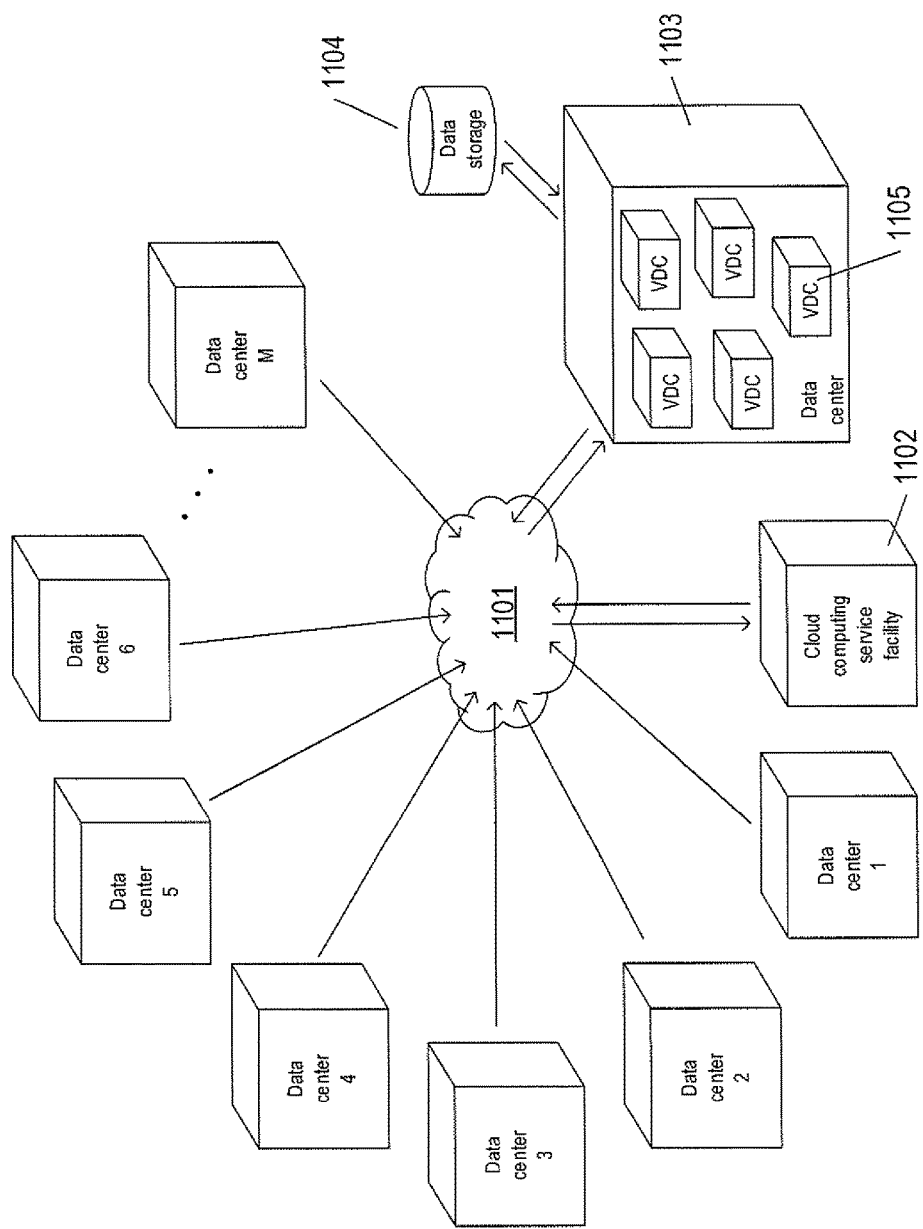
FIG. 11 shows an example of a system to collect cost information from M separate physical data centers.

Computational Methods and Systems to Compute Cloud Computing Industry Benchmarks and Compare the Industry Benchmarks with Costs of Cost Drivers and Virtual Data Center Costs FIG. 11 shows an example of a system to collect cost information from M separate physical data centers that are representative of a cloud computing industry. Each of the physical data centers may be configured as described above with reference to FIG. 7 and has associated cost drivers that drive the cost of operating each data center. Each of the M data centers runs one or more VDCs as described above with reference to FIG. 9 and generates log files, configuration files, hardware inventory, and statistical data on a daily basis and stores the files locally in one or more data-storage devices. The files, inventory, and statistical data may be sent via the Internet 1101 to a cloud computing service facility 1102 that the collects the inventory, files, and statistic data and determines cost drivers and total VDC cost of running one or more VDCs for each of the M data centers. A data center 1103 accesses the cost drivers and total VDC costs of the M data centers provided by the cloud compute service facility 1102 in order to compute industry benchmarks and compare cost drivers and total VDC cost of the data center 1103 against the industry benchmarks. The industry benchmarks may be used to adjust operations of the data center 1103 in order to bring the cost drivers and total VDC cost of the data center 1103 into closer alignment with the cost drivers and total VDC cost of the cloud computing industry.

The cost drivers may be categorized as server hardware, licensing, maintenance, labor, network, and facilities. Each of the cost drivers has an associated cost. For example, server hardware cost is a monetary value that includes depreciation cost of the server computers used to run VMs. The server computers may be grouped according to make and model. A monthly cost of each group of server computers may be computed based on depreciation cost of each group. Server hardware costs may factor in server CPU age with intervals representing the CPU launch data. Licensing cost is a monetary value that includes operating system costs and other application licensing costs. Monthly licensing cost may be distinguished according to licensing types. Maintenance cost includes hardware maintenance cost and operating system maintenance cost. Labor cost is a monetary value that includes labor cost of maintaining hardware, virtual infrastructure, and operating systems. Network cost is a monetary value based on the capacity of each server's network interface controller ("NIC") card. For example, network cost may be based on 1 gigabit NIC or a 10 gigabit NIC. Facilities cost is a monetary value that includes power/cooling costs and rent/real estate costs. Facilities cost may be monthly cost of rent per server rack unit and monthly cost for power and cooling per kilowatt-hours. The total VDC cost is a monetary value that represents total cost of running one or more VDCs in one of the M data centers.

Figure 12:
FIG. 12 shows an example of preprocessing cost drivers and total virtual data center costs of data centers.

The cost drivers and total VDC costs of the M data centers maintained by the cloud computing services facility 1102 may be sent to the data center 1102 on a regular basis, such as daily, weekly, or monthly. The data center 1103 stores the cost drives and total VDC costs in a data-storage device 1104. In the example of FIG. 12, the data center 1103 runs five VDC's, such as VDC 1105. One or more of the VDC's may form a private cloud and up to five private clouds may operate within the data center 1103.

The cost drivers and total VDC costs of the M data centers stored in the one or more data-storage devices 1104 are preprocessed to organize the cost drivers and total VDC costs. FIG. 12 shows an example of preprocessing the cost drivers and total VDC costs associated with each of the M data centers. The cost drivers associated with each of the M data centers are denoted by CostDrivers(m) and the total VDC costs associated with each of the M data centers are denoted by TotalVDCCosts$_m$, where index m=1, . . . , M. For example, the CostDrivers(1) represents the cost drivers of the data center 1, and TotalVDCCosts$_1$ represent the total cost the VDCs running in the data center 1, respectively. In the example of FIG. 12, preprocessing includes separating the total VDC costs and the cost drivers into a set of total VDC costs 1201 and a set of cost drivers 1202. As described above, the cost drivers are categorized by type of cost driver. For example, in FIG. 12, the monetary values (i.e., cost) of each cost driver of the CostDrivers(1) 1203 are denoted by ServerHardwareCost$_1$, LicensingCost$_1$, MaintenanceCost$_1$, LaborCost$_1$, NetworkCost$_1$, and FacilitiesCost$_1$. Preprocessing may include grouping together costs of the same cost driver category. For example, the server hardware costs 1204 of the M data centers are grouped together.

An industry average cost of a cost driver of the M data centers is computed as follows:

$$Ind.Ave.CostDriverCost = \frac{1}{M}\sum_{m=1}^{M} CostDriver_m \quad (1)$$

where CostDriver$_m$ represents the cost of one of the cost drivers: ServerHardwareCost$_m$, Licensing Cost$_m$, MaintenanceCost$_m$, LaborCost$_m$, NetworkCost$_m$, and FacilitiesCost$_m$.

Figure 13:
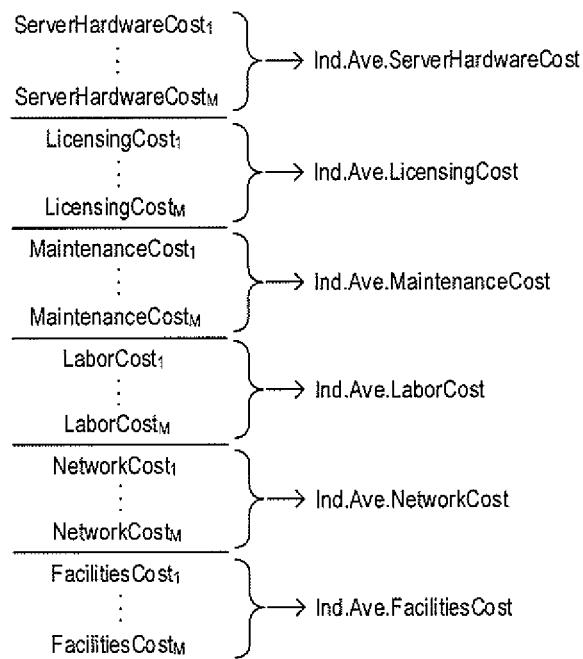
FIG. 13 shows an industry average cost driver cost computed for each category of cost drivers of a number of data centers.

FIG. 13 shows an industry average cost driver cost computed for each of the categories of cost drivers. The industry average cost driver cost represents the average cost of a particular cost driver across the M data centers. For example, in FIG. 13, Ind.Ave.FacilitiesCost represents the average cost of the power/cooling and rent/real estate costs paid by the M data centers, and Ind.Ave.LicensingCost represents the average Labor costs paid by the M data centers.

The industry average cost driver cost of Equation (1) are industry benchmarks that may be used to evaluate costs of the cost drivers of a data center, such as the data center 1103. The costs of the cost drivers may be compared with these industry benchmarks to determine which cost drivers are outliers.

Figure 15A:
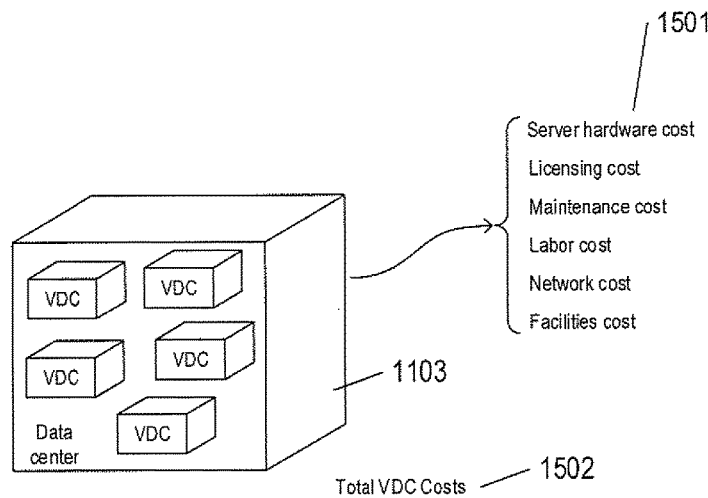
FIG. 15A shows a list of costs of cost drivers associate with operating a data center and a total virtual data center cost of virtual data centers that run in the data center.
Figure 15B:
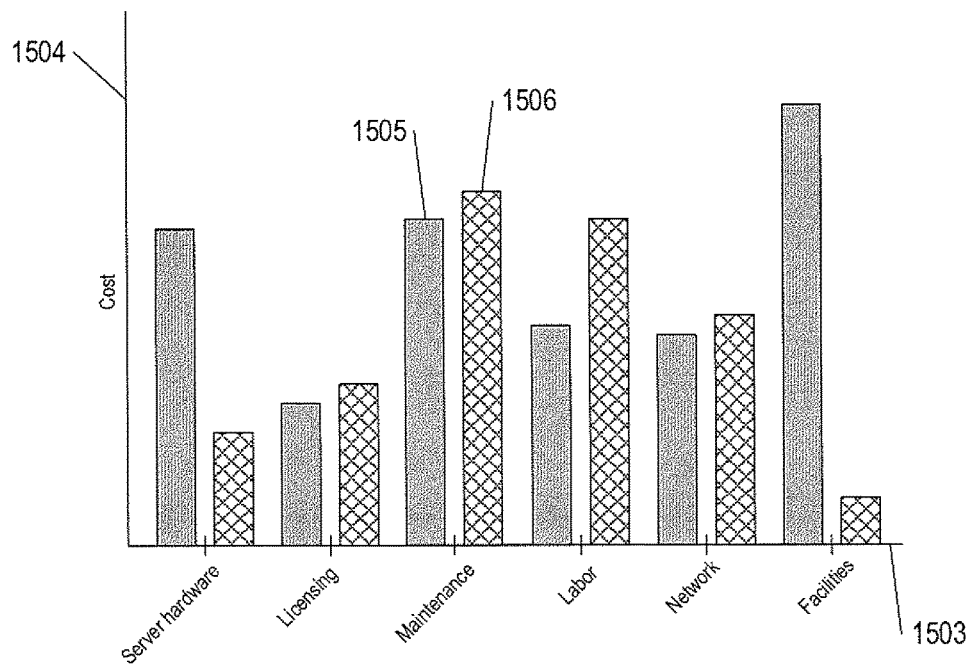
FIG. 15B shows an example bar graph of hypothetical cost versus cost drivers.

FIG. 15A shows a list of costs of cost drivers 1501 associate with operating the data center 1103 and a total VDC cost 1502. The total VDC cost 1502 is the total cost of running the five VDC's in the data center 1103. FIG. 15B shows an example bar graph of hypothetical cost versus cost drivers for the cost drivers of the data center 1103 and industry average cost driver costs. Horizontal axis 1504 represents cost drivers and vertical axis 1505 represents cost. Shaded bars, such as shaded bar 1505, represent the cost of a particular cost driver of the data center 1103. Hash-marked bars, such as hash-marked bar 1506, represent the industry average cost of a cost driver of the M data centers. In the example plot of FIG. 15B, server hardware and facilities cost drivers of the data center 1103 are far greater than the corresponding industry averages, while the cost of other cost drivers, such licensing and network, are more closely aligned with the corresponding industry averages.

Methods may include cost driver thresholds that are used to identify when a cost of a cost driver of a data center is greater than or less an acceptable limits of the corresponding industry average cost associated with the same cost driver. For example, when the absolute value of a difference between the cost of a cost driver and an industry average cost of the same cost driver satisfies the following condition $$|CostDriver-Ind.Ave.CostDriverCost|<\delta_{CD} \quad (2)$$

where $\delta_{CD}$ is a cost driver bound (e.g., $\delta=\$100$);
CostDriver is the cost of a cost driver; and
Ind.Ave.CostDriverCost is the industry average cost of the cost driver for the cloud computing industry,
the cost of the cost driver is within acceptable limits of the industry average cost for the same cost driver.

Each cost driver may have an associated cost driver bound that is different from the cost driver bound associated with the other cost drivers. It may acceptable for the difference between a cost of certain cost driver and the corresponding industry average cost driver cost to much greater than for the cost of another cost driver and the corresponding industry average cost driver cost. For example, facilities cost may vary widely while licensing cost is not expected to have as much variation. As a result, the cost driver bound of the licensing cost driver, $\delta_L$, may be smaller than the cost driver bound of the facilities cost driver, $\delta_F$.

On the other hand, when the condition in Equation (4) is not satisfied and $$CostDriver-Ind.Ave.CostDriverCost>\delta \quad (3)$$

an alert may be generated indicating the cost of the cost driver is greater than the industry average cost of the cost driver. When the condition in Equation (4) is not satisfied and $$CostDriver-Ind.Ave.CostDriverCost<\delta \quad (4)$$

an alert may be generated indicating the cost of the cost driver is less than the industry average cost of the cost driver. IT personnel may adjust data center resources in order to bring operation of cost of a cost driver of the data center closer into alignment with the industry average cost for the same resource.

An industry average of the total VDC costs of the VDCs run by the M data centers is computed as follows:

$$Ind.Ave.TotalVDCCost = \frac{1}{M}\sum_{m=1}^{M} TotalVDCCost_m \quad (5)$$

Figure 14:
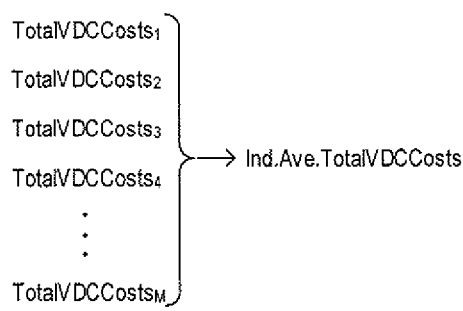
FIG. 14 shows an average total virtual data center cost of a number total virtual data center cost of a number of data centers.

As shown in FIG. 14, an industry average of a total VDC cost represents the average of the total VDC cost across the M data centers.

A portion or fraction of the industry average total VDC cost attributed to each cost driver is computed as follows:

$$IndustryCostDriverFraction = \frac{Ind.Ave.CostDriverCost}{Ind.Ave.TotalVDCCost} \quad (6)$$

The industry cost driver fraction represents the fraction or portion of the average total costs of running the VDC's in the M data centers that may be attributed to a particular cost driver. For example, Ind.Ave.ServerHardwareCost is a quantity that represents an industry average of server hardware costs paid by the M data centers. The quantity Ind.Ave.ServerHardwareFraction represents the fraction or portion of the average total cost of running VDCs in the M data centers that may be attributed to server hardware costs.

Based on the industry cost driver fraction of Equation (3), methods also compute a normalized industry equivalent cost driver cost as follows:

$$Norm.Ind.Equ.CostDriverCost= \\ IndustryCostDriverFraction \times TotalVDCCost \quad (7)$$

The normalized industry equivalent cost driver cost of Equation (7) represents a normalized industry equivalent cost of a cost driver of a data center given the total VDC cost of the data center. The normalized industry equivalent cost driver cost may be used to compute a monetary impact as follows:

$$MonetaryImpact=Norm.Ind.Equ.CostDriverCost- \\ CostDriver \quad (8)$$

The monetary impact may be used to as an indicator of overpaying or underpaying for a particular cost driver. Thresholds may be used to determine if the monetary impact is inside or outside acceptable limits. For example, when the following condition $$|MonetaryImpact|<\varepsilon \quad (9)$$

where $\varepsilon$ is a monetary impact threshold (e.g., $\varepsilon=\$100$), is satisfied, the monetary impact is within acceptable limits. On the other hand, when the condition in Equation (9) is not satisfied and $$MonetaryImpact>\varepsilon \quad (10)$$

an alert may be generated indicating that the data center is overpaying with respect the cost driver. When the condition in Equation (9) is not satisfied and $$MonetaryImpact<\varepsilon \quad (11)$$

an alert may be generated indicating that the data center is underpaying with respect the cost driver. IT personnel may adjust data center resources in order to reduce the size of the monetary impact.

Suppose, for example, an industry facilities fraction for the M data centers calculated according to Equations (1) and (5) is IndustryCostDriverFraction=⅕

Suppose also that the data center 1103 has a TotalVDCCost=$1,000,000 and the cost of the facilities is $400,000. According to Equation (6), the normalized industry equivalent facilities cost is given by:

Norm.Ind.Equ.FacilitiesCost=⅕×$1,000,000=$200,000 and the monetary impact is

MonetaryImpact=$400,000−$200,000=$200,000 which indicates that the data center 1103 is overpaying the cost of facilities by $200,000.

Figure 16:
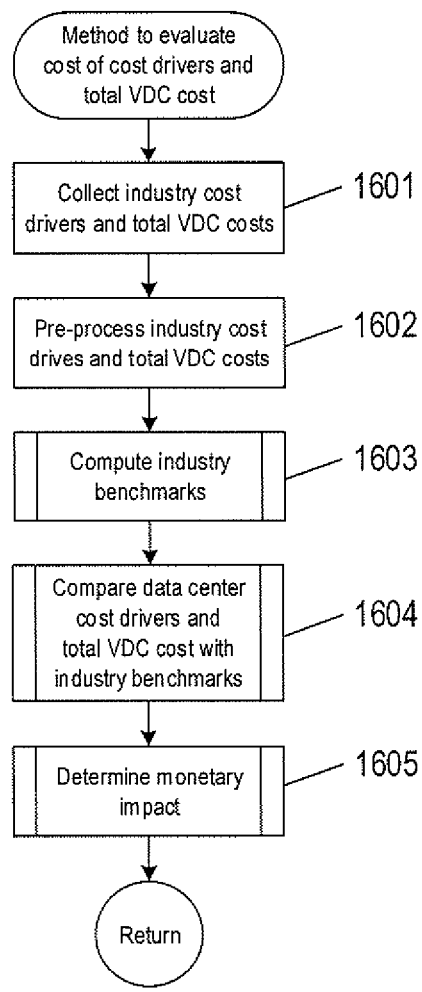
FIG. 16 shows a control-flow diagram of a method to evaluate cost of cost drivers and total virtual data center costs.

FIG. 16 shows a control-flow diagram of a method to evaluate cost of cost drivers and total VDC cost of VDC's that run in a data center. In block 1601, cost drivers and total VDC costs of a cloud computing industry are collected and stored in one or more data-storage devices of data center, as described above with reference to FIG. 11. In block 1602, the cost drivers and total VDC cost collected in block 1601 are preprocessed, as described above with reference to FIG. 12. In block 1603, a routine "compute industry benchmarks" is called to compute industry benchmarks based on costs of the cost drivers. In block 1604, a routine "compare data center cost drivers with industry benchmarks" is called to compare cost drivers of the data center with the cost driver industry benchmarks computed in block 1603. In block 1605, a routine "determine monetary impact" is called to compute the monetary impact of the cost drivers of the data center relative to the cloud computing industry.

Figure 17:
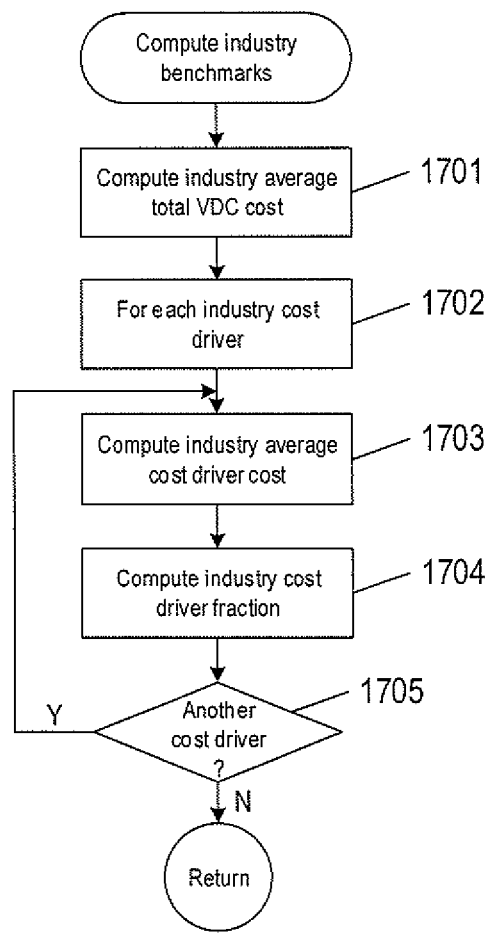
FIG. 17 shows a control-flow diagram of a method to "compute industry benchmarks" called in FIG. 16.

FIG. 17 shows a control-flow diagram of a method to "compute industry benchmarks" called in block 1603 of FIG. 16. In block 1901, an industry average total VDC cost is computed as described above with reference to Equation (5). A for-loop beginning with block 1702 repeats the operations represented by blocks 1703 and 1704 for each cost driver. In block 1703, an industry average cost driver cost is computed as described above with reference to Equation (1). In block 1704, an industry cost driver fraction is computed using the industry average total VDC cost computed in block 1701, as described above with reference to Equation (6). In decision block 1705, if all cost drivers have not been considered, the operations represented by blocks 1703 and 1704 are repeated.

Figure 18:
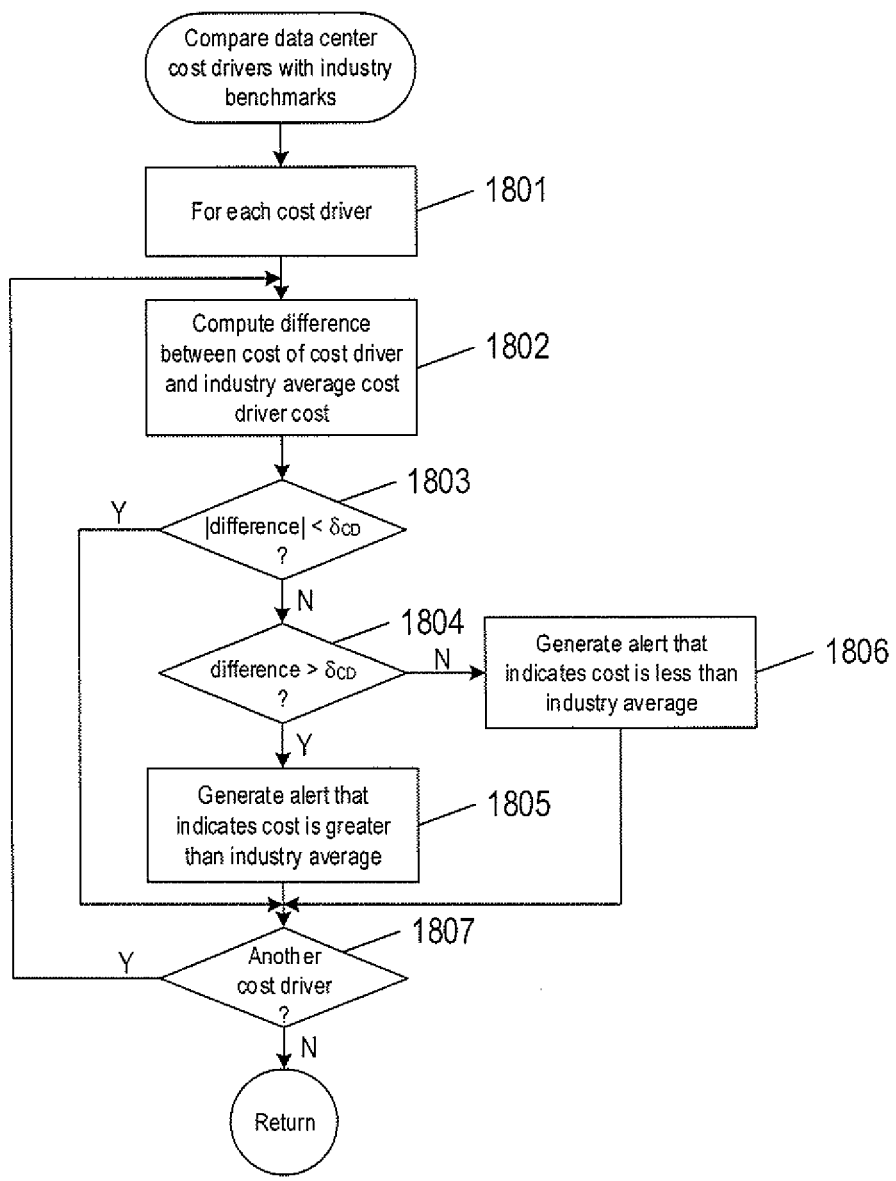
FIG. 18 shows a control-flow diagram of a method to "compare data center cost drivers and total virtual data center cost with industry benchmarks" called in FIG. 16.

FIG. 18 shows a control-flow diagram of a method to "compare data center cost drivers with industry benchmarks" called in block 1604 of FIG. 16. A for-loop beginning with block 1801, repeats the operations represented by blocks 1802-1806. In block 1802, a difference between cost of a cost driver and the industry average cost driver cost, computed in block 1703, is computed as described above with reference to Equation (2). In decision block 1803, when the absolute value of the difference computed in block 1802 is less than an industry average threshold, as described above with reference to Equation (3), control flows to decision block 1807. Otherwise, control flows to decision block 1804. In decision block 1804, when the difference is greater than the industry average threshold, control flows to block 1805. Otherwise, the difference is less than the industry average threshold and control flows to block 1806. In block 1805, an alert may be generated indicating that the cost of the cost driver is greater than the industry average. In block 1806, an alert may be generated indicating that the cost of the cost driver is less than the industry average. In decision block 1807, if all cost drivers have not been considered, the operations represented by blocks 1802-1806 are repeated.

Figure 19:
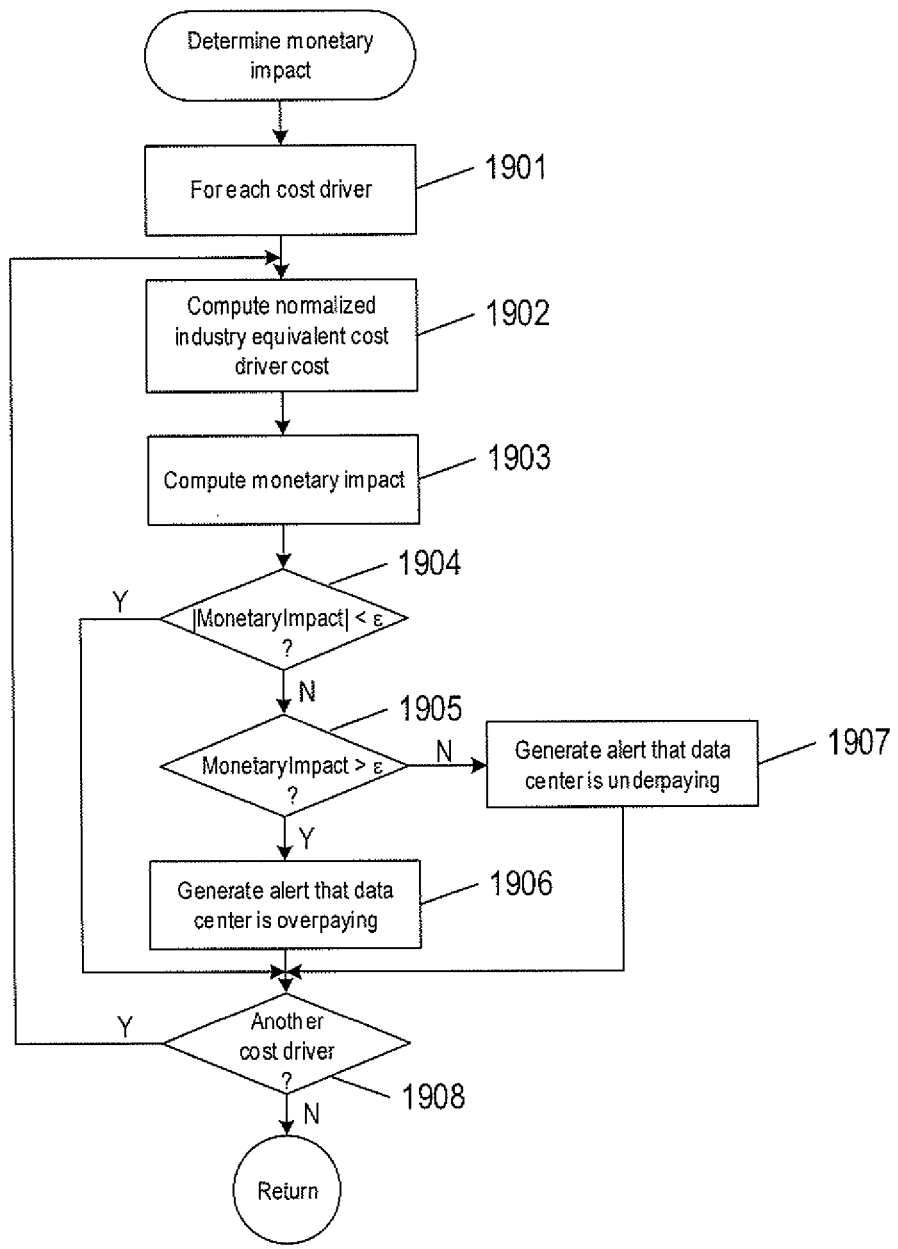
FIG. 19 shows a control-flow diagram of a method to "determine monetary impact" called in FIG. 16.

FIG. 19 shows a control-flow diagram of a method to "determine monetary impact" called in block 1605 of FIG. 16. A for-loop beginning with block 1901 repeats the operations represented by blocks 1902-1907 for each cost driver. In block 1902, a normalized equivalent cost driver cost is computed using the industry cost driver fraction computed in block 1704 of FIG. 17, as described above with reference to Equation (7). In block 1903, a monetary impact is computed as described above with reference to Equation (8). In decision block 1904, when the absolute value of the monetary impact is less than a monetary impact threshold as described above with reference to Equation (9), control flows to decision block 1905. Otherwise control flows to decision block 1907. In decision block 1905, when the monetary impact is greater than the monetary impact threshold, control flows to block 1906. Otherwise control flows to block 1907. In block 1906, an alert may be generated indicating that the data center is overpaying. In block 1907, an alert may be generated indicating that the data center is underpaying. In decision block 1908, if all cost drivers have not been considered, the operations represented by blocks 1902-1907 are repeated.

The methods described above with reference to FIGS. 16-19 may be encoded in machine-readable instructions stored in one or more data-storage devices of a programmable computer, such as the computer described above with reference to FIG. 1.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors of a computing environment to evaluate costs of cost drivers and virtual data centers, the method comprising:
    collecting, by at least one computing device, costs of cost drivers and total virtual data center ("VDC") costs of a cloud computing industry, wherein the costs comprise inventory, files, and statistic data received from a virtual-cloud-connector (VCC) via the Internet to the at least one computing device;
    computing cost driver industry benchmarks of the cloud computing industry based on the costs of the cost drivers;
    comparing costs of cost drivers of a data center with the cost driver industry benchmarks to determine which cost drivers of the data center are outside cost driver bounds;
    determining monetary impact of the cost drivers of the data center based on the cost driver industry benchmarks and the total VDC costs of the cloud computing industry; and
    storing the costs of cost drivers and monetary impact of the cost drivers in the one or more data storage device.

2. The method of claim 1, wherein collecting the costs of cost drivers and total VDC costs of the cloud computing industry further comprises collecting the costs of cost drivers and total VDC costs from multiple data centers.

3. The method of claim 1, wherein computing the cost driver industry benchmarks of the cloud computing industry further comprises computing an industry average cost driver cost for each cost driver in the cloud computing industry.

4. The method of claim 1, wherein comparing the costs of cost drivers of the data center with the cost driver industry benchmarks further comprises:
    computing an industry average cost driver cost for each cost driver of the cloud computing industry; and
    for each cost driver of the data center,
        computing a difference between a cost of the cost driver of the data center and a corresponding industry average cost driver cost,
        when the difference is greater than a cost driver bound associated with the cost driver, generating an alert that indicates the cost of the cost driver is greater than the industry average cost drive cost, and
        when the difference is less than a cost driver bound associated with the cost driver, generating an alert that indicates the cost of the cost driver is less than the industry average cost drive cost.

5. The method of claim 1, wherein determining the monetary impact of the cost drivers of the data center further comprises:
computing an industry average total VDC cost based on the total VDC costs of the cloud computing industry;
for each cost driver of the cloud computing industry,
computing an industry average cost driver cost, and
computing an industry cost driver fraction based on the industry average cost driver cost and the industry average total VDC cost; and
for each cost driver of the data center,
computing a normalized industry equivalent cost driver cost based on the industry cost driver fraction of the cost driver and the total VDC cost of the data center,
computing the monetary impact based on the normalized industry equivalent cost driver cost and the cost driver,
when the monetary impact is greater than a monetary impact threshold, generating an alert that indicates overpayment of the cost driver, and
when the monetary impact is less than a monetary impact threshold, generating an alert that indicates underpayment of the cost driver.

6. The method of claim 1, wherein the cost drivers include server hardware, licensing, maintenance, labor, network, and facilities.

7. A system comprising:
one or more processors;
one or more data-storage devices; and
machine-readable instructions stored in the data-storage devices and executed using the one or more processors, the machine-readable instructions:
collecting costs of cost drivers and total virtual data center ("VDC") costs of a cloud computing industry, wherein the costs comprise inventory, files, and statistic data received from a virtual-cloud-connector (VCC) via the Internet to the at least one computing device;
computing cost driver industry benchmarks of the cloud computing industry based on the costs of the cost drivers;
comparing costs of cost drivers of a data center with the cost driver industry benchmarks to determine which cost drivers of the data center are outside cost driver bounds;
determining monetary impact of the cost drivers of the data center based on the cost driver industry benchmarks and the total VDC costs of the cloud computing industry; and
storing the costs of cost drivers and monetary impact of the cost drivers in the one or more data storage device.

8. The system of claim 7, wherein collecting the costs of cost drivers and total VDC costs of the cloud computing industry further comprises collecting the costs of cost drivers and total VDC costs from multiple data centers.

9. The system of claim 7, wherein computing the cost driver industry benchmarks of the cloud computing industry further comprises computing an industry average cost driver cost for each cost driver in the cloud computing industry.

10. The system of claim 7, wherein comparing the costs of cost drivers of the data center with the cost driver industry benchmarks further comprises:
computing an industry average cost driver cost for each cost driver of the cloud computing industry; and
for each cost driver of the data center,
computing a difference between a cost of the cost driver of the data center and a corresponding industry average cost drive cost,
when the difference is greater than a cost driver bound associated with the cost driver, generating an alert that indicates the cost of the cost driver is greater than the industry average cost drive cost, and
when the difference is less than a cost driver bound associated with the cost driver, generating an alert that indicates the cost of the cost driver is less than the industry average cost drive cost.

11. The system of claim 7, wherein determining the monetary impact of the cost drivers of the data center further comprises:
computing an industry average total VDC cost based on the total VDC costs of the cloud computing industry;
for each cost driver of the cloud computing industry,
computing an industry average cost driver cost, and
computing an industry cost driver fraction based on the industry average driver cost and the industry average total VDC cost; and
for each cost driver of the data center,
computing a normalized industry equivalent cost driver cost based on the industry cost driver fraction of the cost driver and the total VDC cost of the data center,
computing the monetary impact based on the normalized industry equivalent cost driver cost and the cost driver,
when the monetary impact is greater than a monetary impact threshold, generating an alert that indicates overpayment of the cost driver, and
when the monetary impact is less than a monetary impact threshold, generating an alert that indicates underpayment of the cost driver.

12. The system of claim 7, wherein the cost drivers include server hardware, licensing, maintenance, labor, network, and facilities.

13. A non-transitory computer-readable medium encoded with machine-readable instructions that implement a method carried out by one or more processors of a computer system to perform the operations of:
collecting costs of cost drivers and total virtual data center ("VDC") costs of a cloud computing industry, wherein the costs comprise inventory, files, and statistic data received from a virtual-cloud-connector (VCC) via the Internet to the computing system;
computing cost driver industry benchmarks of the cloud computing industry based on the costs of the cost drivers;
comparing costs of cost drivers of a data center with the cost driver industry benchmarks to determine which cost drivers of the data center are outside cost driver bounds;
determining monetary impact of the cost drivers of the data center based on the cost driver industry benchmarks and the total VDC costs of the cloud computing industry; and
storing the costs of cost drivers and monetary impact of the cost drivers in one or more data storage device.

14. The medium of claim 13, wherein collecting the costs of cost drivers and total VDC costs of the cloud computing industry further comprises collecting the costs of cost drivers and total VDC costs from multiple data centers.

15. The medium of claim 13, wherein computing the cost driver industry benchmarks of the cloud computing industry further comprises computing an industry average cost driver cost for each cost driver in the cloud computing industry.

16. The medium of claim 13, wherein comparing the costs of cost drivers of the data center with the cost driver industry benchmarks further comprises:
   computing an industry average cost driver cost for each cost driver of the cloud computing industry; and
   for each cost driver of the data center,
      computing a difference between a cost of the cost driver of the data center and a corresponding industry average cost drive cost,
      when the difference is greater than a cost driver bound associated with the cost driver, generating an alert that indicates the cost of the cost driver is greater than the industry average cost drive cost, and
      when the difference is less than a cost driver bound associated with the cost driver, generating an alert that indicates the cost of the cost driver is less than the industry average cost drive cost.

17. The medium of claim 13, wherein determining the monetary impact of the cost drivers of the data center further comprises:
   computing an industry average total VDC cost based on the total VDC costs of the cloud computing industry;
   for each cost driver of the cloud computing industry,
      computing an industry average cost driver cost, and
      computing an industry cost driver fraction based on the industry average driver cost and the industry average total VDC cost; and
   for each cost driver of the data center,
      computing a normalized industry equivalent cost driver cost based on the industry cost driver fraction of the cost driver and the total VDC cost of the data center,
      computing the monetary impact based on the normalized industry equivalent cost driver cost and the cost driver,
      when the monetary impact is greater than a monetary impact threshold, generating an alert that indicates overpayment of the cost driver, and
      when the monetary impact is less than a monetary impact threshold, generating an alert that indicates underpayment of the cost driver.

18. The medium of claim 13, wherein the cost drivers includes server hardware, licensing, maintenance, labor, network, and facilities.

* * * * *